US011200816B2

United States Patent
Wang et al.

(10) Patent No.: US 11,200,816 B2
(45) Date of Patent: Dec. 14, 2021

(54) HEAD ASSEMBLY WITH FACIAL INSERT FOR CRASH TEST DUMMY

(71) Applicant: Humanetics Innovative Solutions, Inc., Farmington Hills, MI (US)

(72) Inventors: Zhenwen Jerry Wang, Farmington Hills, MI (US); John Arthur, Milan, OH (US); Dominic Isopi, Livonia, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 745 days.

(21) Appl. No.: 15/847,489

(22) Filed: Dec. 19, 2017

(65) Prior Publication Data

US 2018/0247567 A1    Aug. 30, 2018

Related U.S. Application Data

(60) Provisional application No. 62/464,108, filed on Feb. 27, 2017.

(51) Int. Cl.
*G09B 23/30* (2006.01)
*G09B 23/34* (2006.01)

(52) U.S. Cl.
CPC ............ *G09B 23/30* (2013.01); *G09B 23/34* (2013.01)

(58) Field of Classification Search
CPC ................................ G09B 23/30; G09B 23/34
See application file for complete search history.

(56) References Cited

U.S. PATENT DOCUMENTS

| 4,691,556 | A | * | 9/1987 | Mellander | G01M 17/0078 73/1.15 |
|---|---|---|---|---|---|
| 4,701,132 | A | * | 10/1987 | Groesch | G09B 23/28 434/274 |
| 6,500,009 | B1 | | 12/2002 | Brault et al. | |
| 6,691,585 | B2 | | 2/2004 | Ahn | |
| 7,204,165 | B1 | * | 4/2007 | Plaga | G01M 17/0078 73/12.01 |
| 7,251,131 | B2 | * | 7/2007 | Shah | G11B 33/12 248/634 |
| 7,988,452 | B2 | | 8/2011 | Eiwen et al. | |
| 8,056,427 | B2 | | 11/2011 | Wang et al. | |
| 9,552,747 | B1 | | 1/2017 | Lytle | |
| 2002/0083783 | A1 | | 7/2002 | Ahn | |

(Continued)

FOREIGN PATENT DOCUMENTS

EP           1136970 A1      9/2001
FR           2358716 A1 *    2/1978    ........ G01M 17/0078

OTHER PUBLICATIONS

"The Development of an Improved ATD Headform with a Frangible Facial Insert," Gallup, B. et al. (Year: 2016).*

(Continued)

*Primary Examiner* — Jerry-Daryl Fletcher
*Assistant Examiner* — Jennifer L Korb
(74) *Attorney, Agent, or Firm* — Howard & Howard Attorneys PLLC

(57) ABSTRACT

A head assembly for a crash test dummy includes a skull, a head skin disposed over the skull, and a facial insert disposed between the skull and the head skin and having a plurality of defined cell structures to achieve a biomechanical response that provides for evaluation of potential head injuries during vehicle crash testing.

16 Claims, 7 Drawing Sheets

(56) References Cited

U.S. PATENT DOCUMENTS

| 2010/0229663 | A1 | | 9/2010 | Wang et al. |
| 2012/0330599 | A1 | * | 12/2012 | Roberts .............. G01R 33/0064 |
| | | | | 702/150 |
| 2017/0261416 | A1 | | 9/2017 | Wu et al. |
| 2019/0145740 | A1 | * | 5/2019 | Czerski .................. A41D 31/28 |
| | | | | 2/463 |

OTHER PUBLICATIONS

Melvin, J., Little, W., Smrcka, J., Zhu, Y. et al., "A Biomechanical Face for the Hybrid III Dummy," SAE Technical Paper 952715, 1995, pp. 139-151 (Year: 1995).*

"Foundations and Elements of the NHTSA THOR Alpha ATD Design," Haffner et al., National Highway Traffic Safety Administration, 2001, pp. 1-12 (Year: 2001).*

"A Biomechanical Face for the Hybrid III Dummy," Melvin et al., SAE Technical Paper 952715, 1995, pp. 139-151 (Year: 1995).*

Computer-generated English language abstract for EP1136970A1 extracted from espacenet.com database on Aug. 22, 2018, 3 pages.

European Search Report for European Application No. 18157704.0 dated Aug. 22, 2018, 6 pages.

ADIPRENE® LF Products, Esters & Ethers, Composite Data and Technical Information, 2011, 6 pages.

Certified English Translation of French Patent No. 2358716A1 (Application No. 7621729), Jan. 13, 2020, 7 pages.

* cited by examiner

HEAD ASSEMBLY WITH FACIAL INSERT FOR CRASH TEST DUMMY

CROSS-REFERENCE TO RELATED APPLICATION(S)

The present application claims the benefit of U.S. Provisional Patent Application Ser. No. 62/464,108, filed Feb. 27, 2017, the entire disclosure of which is hereby expressly incorporated by reference.

BACKGROUND OF THE INVENTION

1. Field of the Invention

The present invention relates generally to crash test dummies and, more particularly, to head assembly with a facial insert for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including cervical spine or neck), rib cage or torso assembly, pelvis assembly, right and left arm assemblies, and right and left leg assemblies. The head assembly is typically constructed with a metal skull, a polymer head skin, and other mechanical parts that are used to connect with the neck assembly and house sensors. The head assembly may include a solid foam insert between the head skin and the skull to achieve a facial impact biomechanical response. In an ATD certification and biofidelity test, which post mortem human subjects were tested to establish the human mechanical responses, a rigid disk is launched to impact the face of the crash test dummy to ensure that the head assembly of the crash test dummy has a similar response to a human.

Due to the localized high force generated in the impact test, the typically used foam material deteriorates after each test due to the physical damage to the foam insert itself. The damage in each test causes change of the material properties of the foam insert and alternates the response of the head assembly. The majority of the current foam inserts fail the test in less than five tests, which makes the foam insert not suitable for a dummy design due to its lack of repeatability.

As such, it is desirable to have a head assembly for a crash test dummy with a facial insert that is more durable for repeatability during vehicle crash testing. It is also desirable to have a head assembly for a crash test dummy with a facial insert that has been adjusted for different force versus deflection properties. It is further desirable to provide a head assembly for a crash test dummy with an adjusted and varied facial insert. Thus, there is a need in the art for a new head assembly having a facial insert for a crash test dummy that meets at least one of these desires.

SUMMARY OF THE INVENTION

Accordingly, the present invention provides a head assembly for a crash test dummy. The head assembly includes a skull, a head skin disposed over the skull, and a facial insert disposed between the skull and the head skin and having a plurality of defined cell structures to achieve a biomechanical response that provides for evaluation of potential head injuries during vehicle crash testing.

In addition, the present invention provides a crash test dummy including a head assembly and a body operatively attached to the head assembly. The head assembly includes a skull, a head skin disposed over the skull, and a facial insert disposed between the skull and the head skin and having a plurality of defined cell structures to achieve a biomechanical response that provides for evaluation of potential head injuries during vehicle crash testing.

One advantage of the present invention is that a new head assembly is provided for a crash test dummy. Another advantage of the present invention is that the head assembly includes a facial insert having a honeycomb design, made of a plurality of solid materials, for use during vehicle crash testing. Yet another advantage of the present invention is that the facial insert includes defined cell structures. Still another advantage of the present invention is that the facial insert may be constructed and/or adjusted for different force versus deflection properties. A further advantage of the present invention is that facial insert is more humanlike than ever before. Still a further advantage of the present invention is that the facial insert allows for adjusting the stiffness with the thickness of the honeycomb and the material stiffness to achieve the proper biomechanical response of the head assembly.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
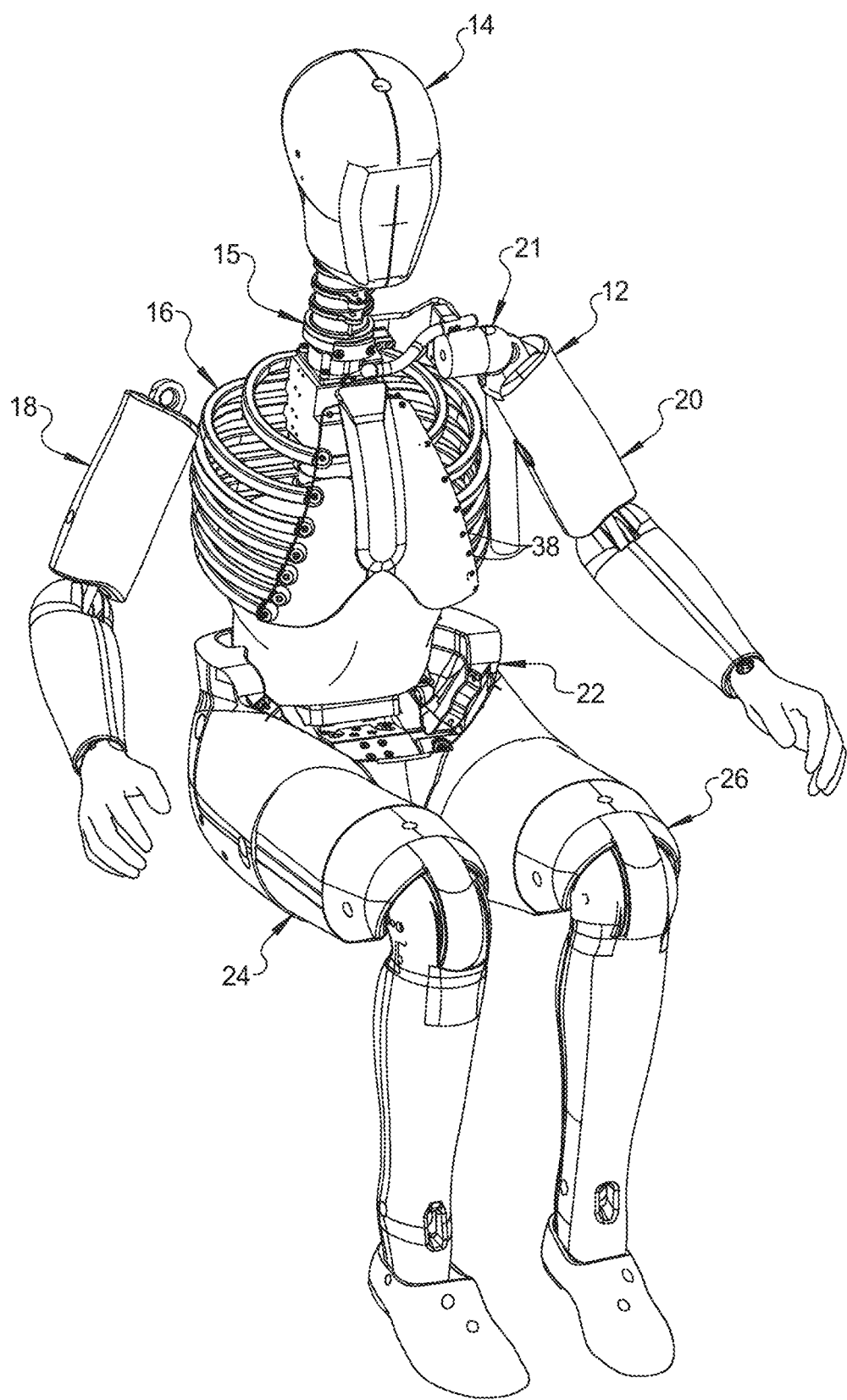
FIG. 1 is a perspective view of a crash test dummy with a head assembly, according to one embodiment of the present invention.
Figure 2:
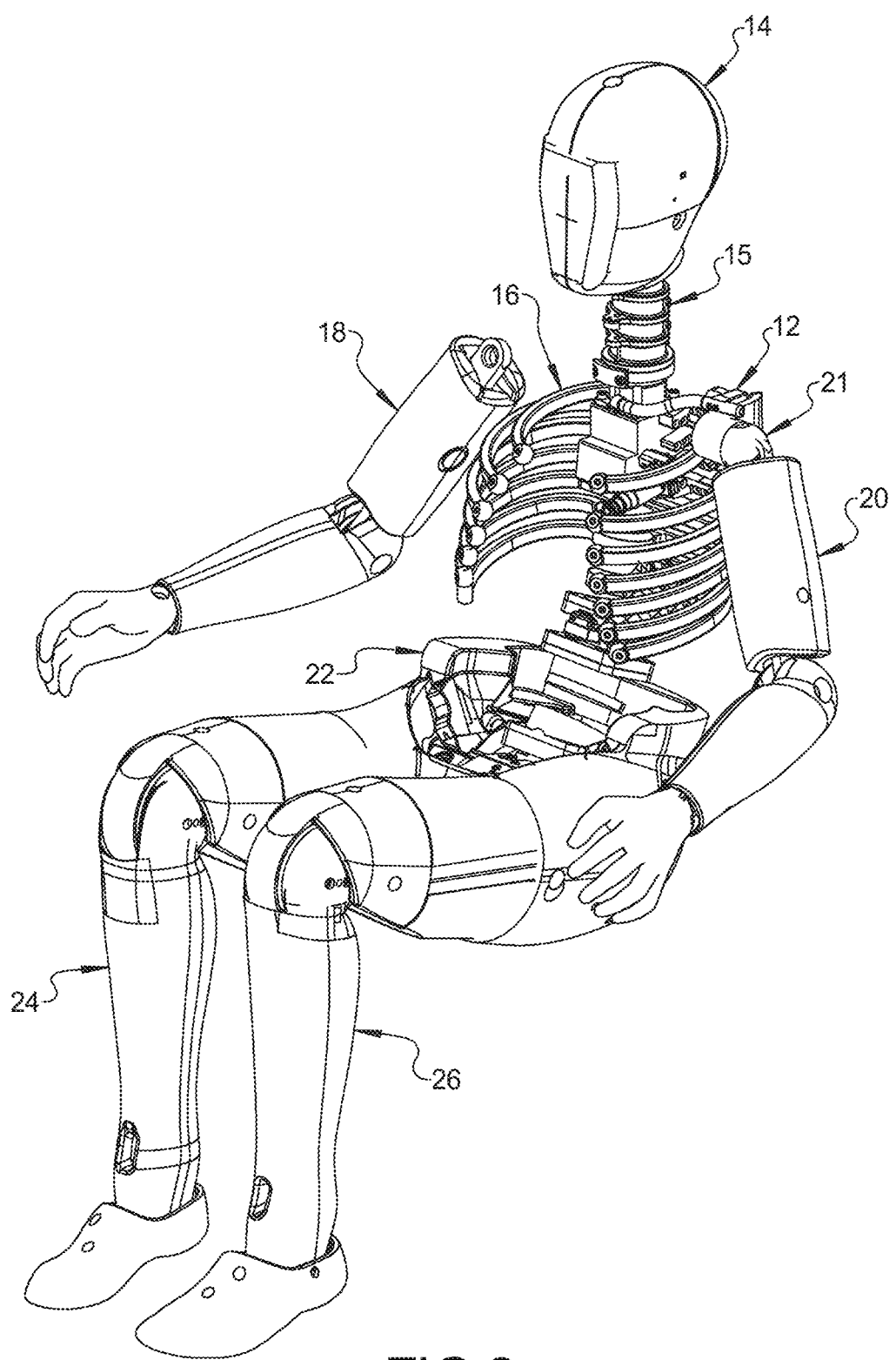
FIG. 2 is another perspective view of the crash test dummy of FIG. 1.

Referring to the drawings and in particular FIG. 1, one embodiment of a crash test dummy, according to the present invention, is generally indicated at 12. In one embodiment, the crash test dummy 12 is of a fiftieth percentile (50%) male type and is illustrated in a sitting position. This crash test dummy 12 is used primarily to test the performance of vehicle interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. It should also be appreciated that the crash test dummy 12 may be of any suitable size.

As illustrated in FIG. 1, the crash test dummy 12 includes a head assembly, according to the present invention and generally indicated at 14, to be described. The crash test dummy 12 also includes a spine assembly, generally indicated at 15, having an upper end mounted to the head assembly 14 and a lower end extending into a torso area of the crash test dummy 12. It should be appreciated that the spine assembly 15 includes a neck attached to the head assembly 14.

The torso area of the crash test dummy 12 includes a rib cage assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via a shoulder assembly, generally indicated at 21. It should be appreciated that a lower end of the spine assembly 15 is connected to a lumbar-thoracic adapter (not shown), which is connected to a lumbar to pelvic adapter (not shown).

As illustrated in the FIG. 1, the crash test dummy 12 also includes a pelvis assembly, generally indicated at 22, connected to the pelvic adapter. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly for biofidelity of the crash test dummy 12.

Figure 3:
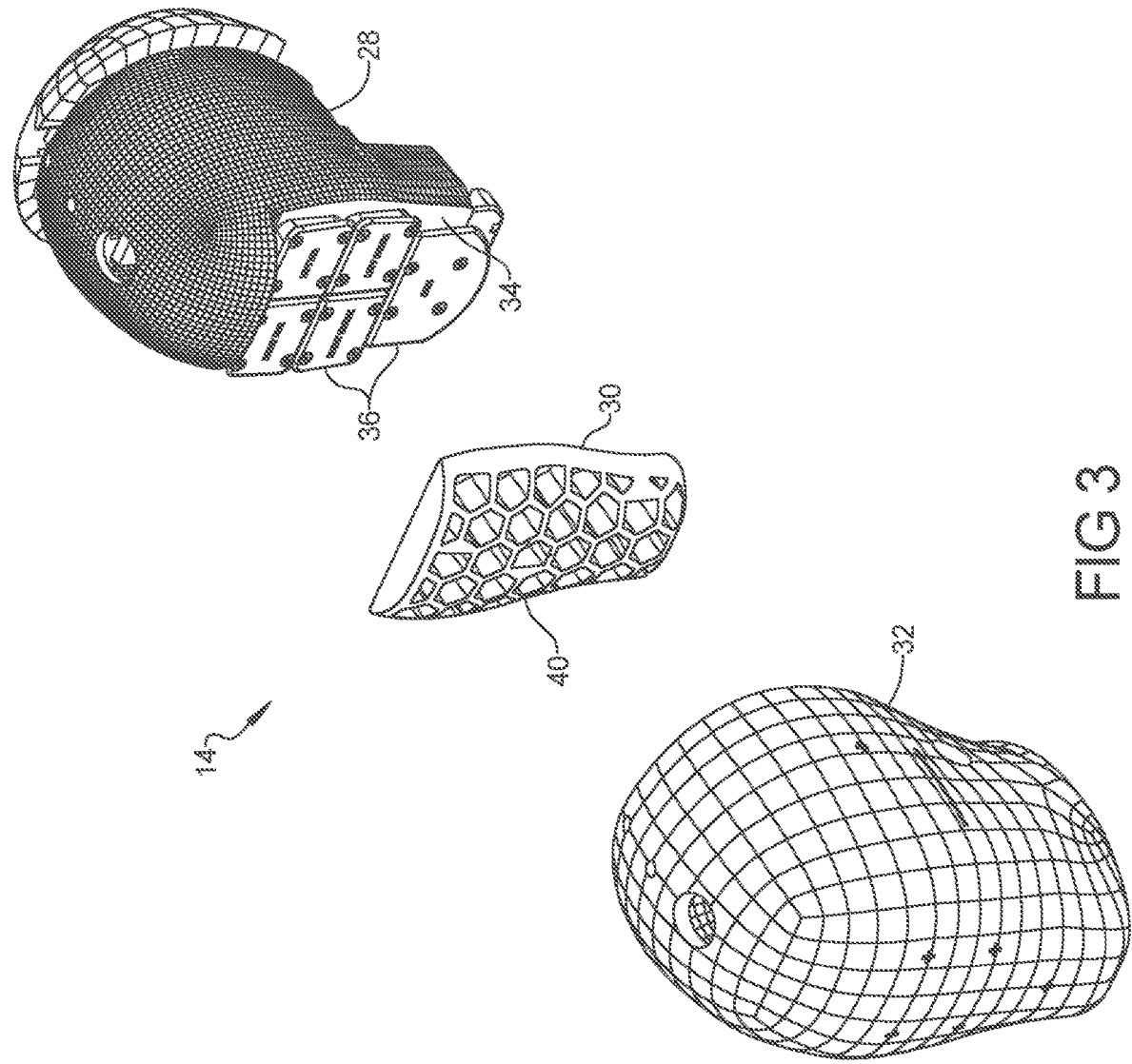
FIG. 3 is an exploded view of the head assembly of the crash test dummy of FIGS. 1 and 2.
Figure 4:
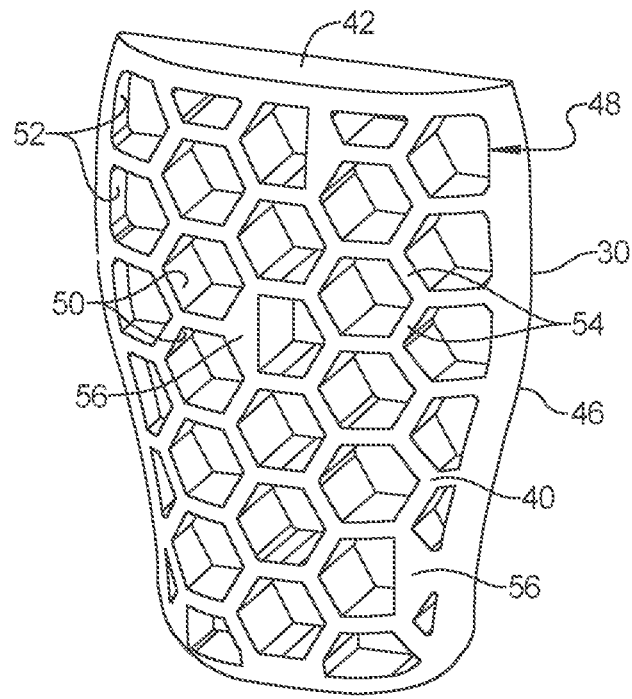
FIG. 4 is a front perspective view of one embodiment of a facial insert, according to the present invention, of the head assembly FIG. 3.
Figure 5:
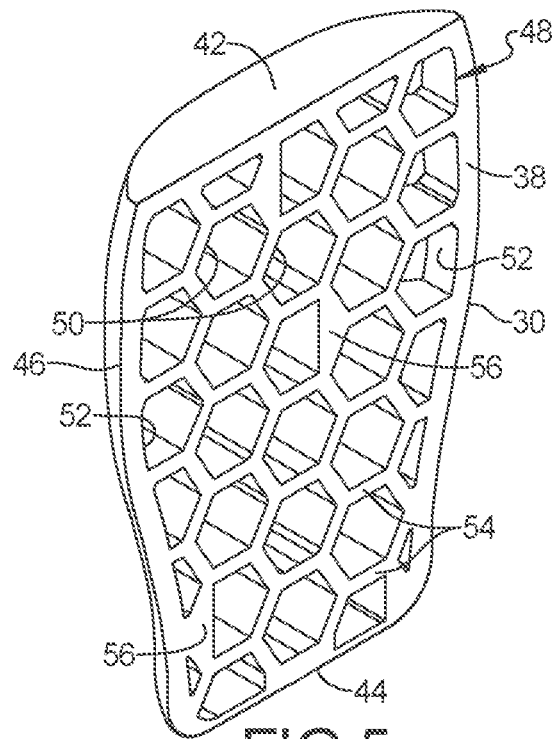
FIG. 5 is a rear perspective view of one embodiment of the facial insert of the head assembly FIG. 3.
Figure 7:
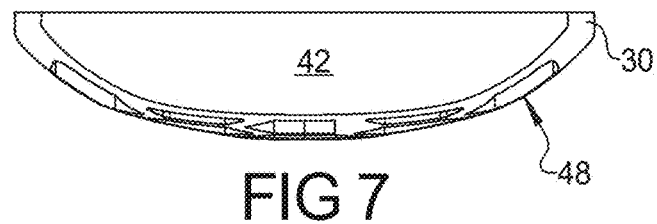
FIG. 7 is a top elevational view of one embodiment of the facial insert of the head assembly FIG. 3.
Figure 9:
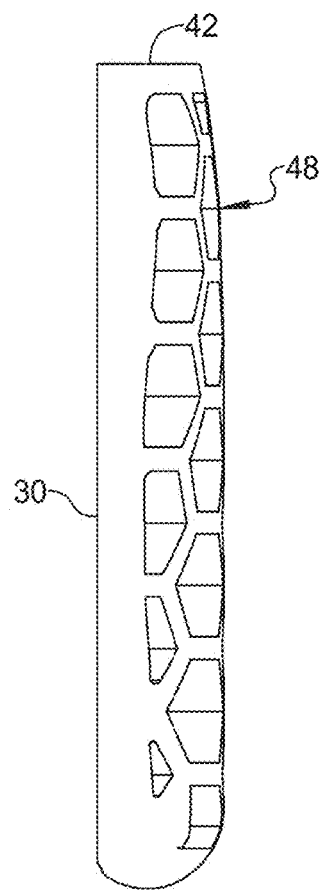
FIG. 9 is a right side elevational view of one embodiment of the facial insert of the head assembly FIG. 3.
Figure 6:
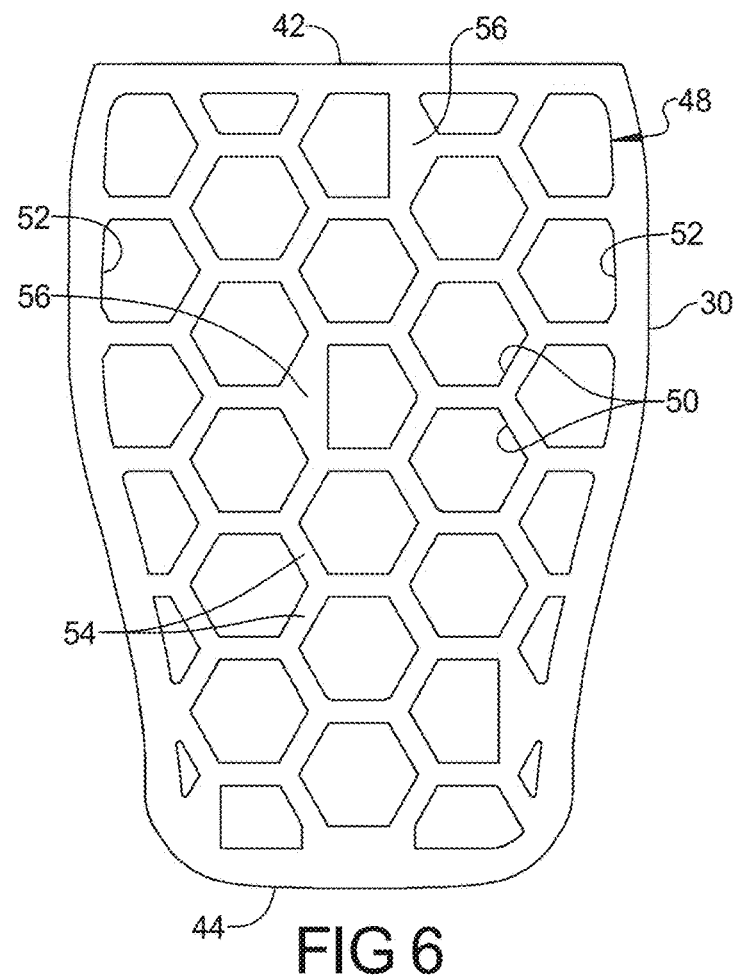
FIG. 6 is a front elevational view of one embodiment of the facial insert of the head assembly FIG. 3.
Figure 8:
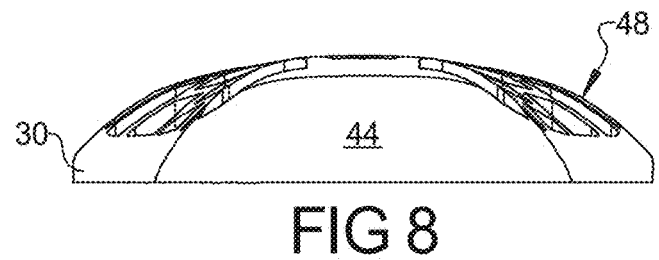
FIG. 8 is a bottom elevational view of one embodiment of the facial insert of the head assembly FIG. 3.
Figure 10:
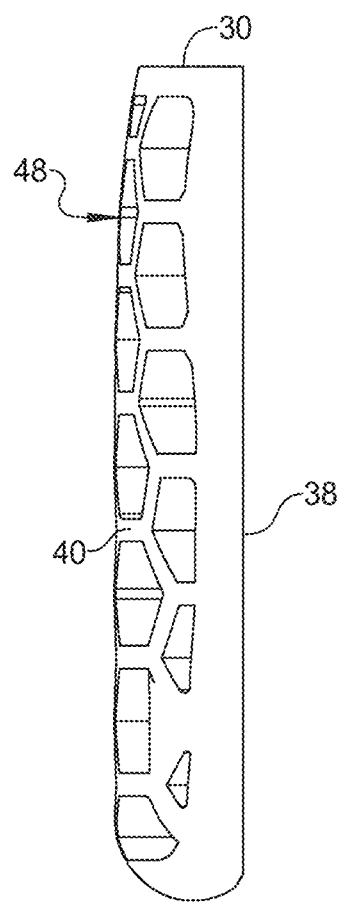
FIG. 10 is left side elevational view of one embodiment of the facial insert of the head assembly FIG. 3.
Figure 11:
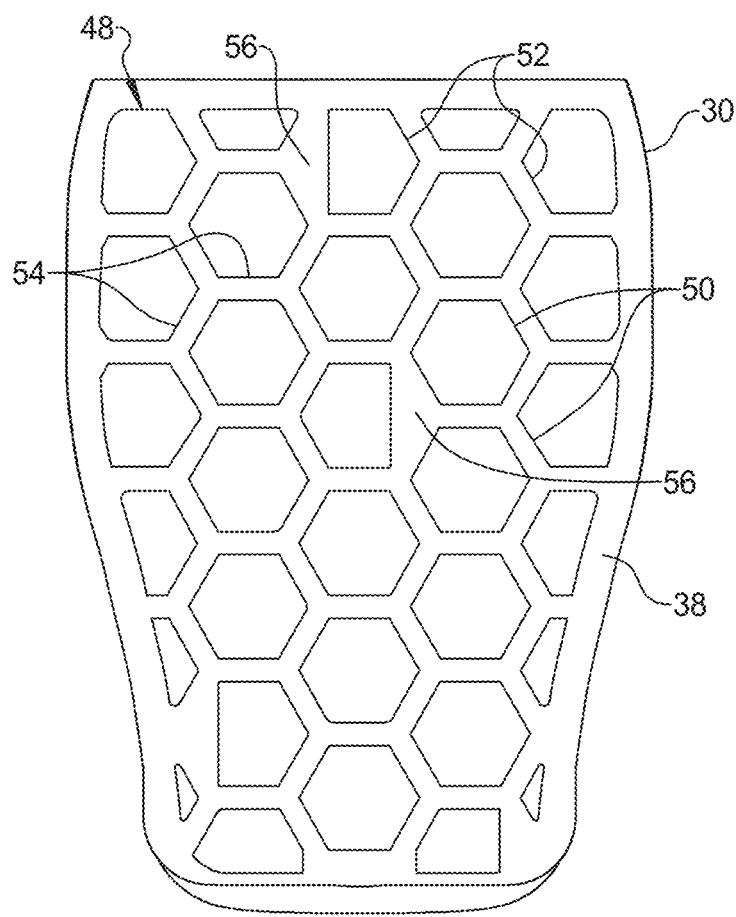
FIG. 11 is a rear elevational view of one embodiment of the facial insert of the head assembly FIG. 3.

Referring to FIG. 3, one embodiment of the head assembly 14, according to the present invention, is shown for the crash test dummy 12. The head assembly 14 includes a skull 28, a facial insert 30, according to the present invention, and a head skin 32 that provides for evaluation of potential head injuries during vehicle crash testing. In the embodiment illustrated, the skull 28 includes a recess 34 to receive the facial insert 30. The head assembly 14 may also include one or more pressure sensors 36 disposed in the recess 34 behind the facial insert 30 and cooperating with the skull 28. In one embodiment, the skull 28 is made of a metal material such as aluminum. The head skin 32 is disposed on an exterior surface of the facial insert 30 and skull 28. In one embodiment, the head skin 32 is made of a relatively flexible material such as a polymeric material. It should be appreciated that the facial insert 30 is disposed in the recess 34 of the skull 28 between the skull 28 and the head skin 32.

Referring to FIGS. 3-11, one embodiment of the facial insert 30, according to the present invention, is shown. In one embodiment, the facial insert 30 is made of a solid polymeric material. In one embodiment, the polymeric material may be a TDI-based polyester prepolymer sold by Chemtura Corporation under the tradename ADIPRENE®, such as ADIPRENE® LF 1700A. In another embodiment, the facial insert 30 is made of a plurality of solid materials. In other embodiments, the material may be any suitable durable material. In one embodiment, the facial insert 30 has a planar rear surface 38, an arcuate front surface 40, a planar top end surface 42, a planar bottom end surface 44, and non-linear side surfaces 46. It should be appreciated that the surfaces 38, 40, 42, 44, and 46 may be varied to simulate a human face.

The facial insert 30 also includes a plurality of defined cell structures, generally indicated at 48. Said differently, the facial insert 30 includes a plurality of cell structures 48 having predetermined cell structure geometry that may vary within the facial insert 30. In one embodiment, the cell structures 48 are generally hexagonal in shape, but may be any suitable shape as needed to achieve biomechanical requirements, such as round holes, square holes or a combination of different shaped and different sized holes or cells. It should be appreciated that the cell structures 48 of the facial insert 30 form a honeycomb pattern.

In the embodiment illustrated, the cell structures 48 extend axially in one direction. In other embodiments, the cell structures 48 may extend axially in any direction. In one embodiment, the cell structures 48 are closed cells. It should be appreciated that the cell structures 48 do not penetrate the surfaces 42, 44, and 46.

In one embodiment, the cell structures 48 include at least a plurality of first cells 50 and a plurality of second cells 52 different from the first cells 50. In the embodiment illustrated, the first cells 50 have a cross-sectional area larger than a cross-sectional area of the second cells 52. In the embodiment illustrated, the first cells 50 are tessellated using hexagonal cell structures 48 and the second cells 52 are tessellated using pentagonal cell structures 48 to better illustrate potential differences in the cell structure 48 available between the first cells 50 and the second cells 52. In one embodiment, the facial insert 30 further includes at least a plurality of first walls 54 and a plurality of second walls 56 between the cell structures 48. The cell size of the cell structures 48 and wall thicknesses of the walls 54, 56 may be chosen based on a mathematical model that is validated in testing. It should be appreciated that, since it is possible to define a shape of a cell structure 48, different force versus deflection properties inherent in cell structure geometry can be constructed within a single facial insert 30 to achieve the proper biomechanical response of the head assembly 14. It should also be appreciated that the cell structures 48 and walls 54, 56 may be adjusted along with the thicknesses of the cell structures 48 and the material stiffness to achieve the desired biomechanical response of the facial insert 30. It should be appreciated that the facial insert 30 may be produced by any suitable process known in the art.

Figure 12:
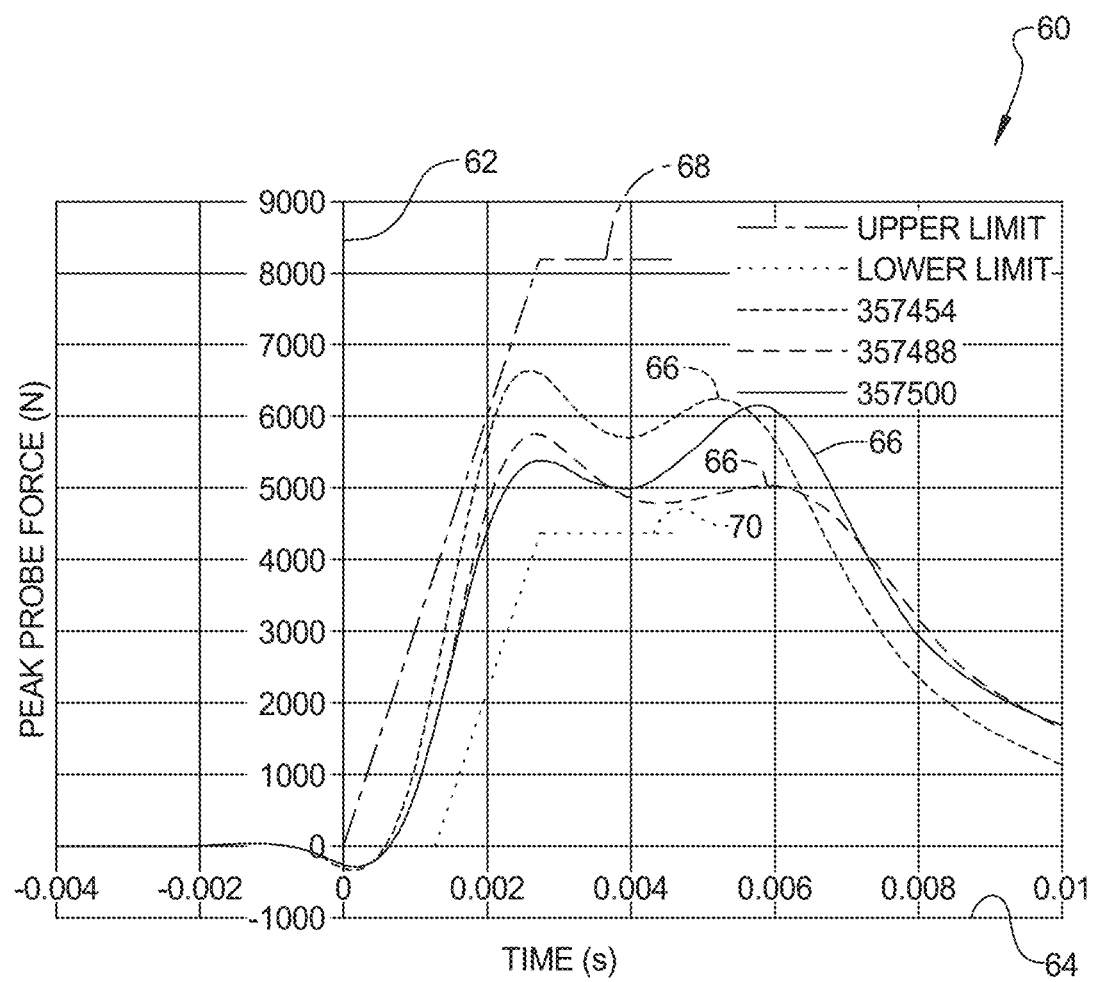
FIG. 12 is a graph of peak force versus time for the facial insert of FIG. 3.

Referring to FIG. 12, a graph 60 of impact test results for the facial insert 30 is shown. In one embodiment, the graph 60 includes a y-axis 62 of peak probe force in Newtons (N) and an x-axis 64 of time in seconds (s). The graph 60 shows several plots 66 between an upper limit 68 and a lower limit 70 of certification corridors for the facial insert 30. It should be appreciated that the facial insert 30 is suitable for vehicle testing due to its repeatability.

Accordingly, the head assembly 14 of the present invention allows the crash test dummy 12 to have the facial insert 30, according to the present invention, to achieve a biomechanical response that provides for evaluation of potential head injuries during vehicle crash testing of the dummy 12. In addition, the facial insert 30 of the present invention has a honeycomb design for use during vehicle crash testing. The facial insert 30 of the present invention is made of a solid material that includes defined cell structures 48. The facial insert 30 of the present invention may be constructed and/or adjusted for different force versus deflection properties. The facial insert 30 of the present invention allows for adjusting the stiffness with the thickness of the honeycomb and the material stiffness to achieve the proper biomechanical response of the head assembly 14.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A head assembly for a crash test dummy comprising:
   a skull having a recess;
   a head skin disposed over said skull;
   a facial insert received in said recess and disposed between said skull and said head skin with said facial insert having a plurality of defined cell structures extending entirely through said facial insert between a front surface and an opposing rear surface to define a plurality of walls between said defined cell structures to achieve a repeatable biomechanical response for at least five impact tests that provides for evaluation of potential head injuries during vehicle crash testing; and
   at least one sensor disposed within said recess between said skull and said facial insert with said rear surface of said facial insert engaging said at least one sensor to measure a force applied to said facial insert for evaluation during vehicle crash testing.

2. A head assembly as set forth in claim 1 wherein said cell structures are hexagonal in shape.

3. A head assembly as set forth in claim 1 wherein said cell structures are pentagonal in shape.

4. A head assembly as set forth in claim 1 wherein said cell structures are round shape, square shape, or a combination of the round and square shapes.

5. A head assembly as set forth in claim 1 wherein said cell structures are of different sizes or a combination of different sizes.

6. A head assembly as set forth in claim 1 wherein said cell structures include at least a plurality of first cells each having a first cross-sectional area and a plurality of second cells different from said first cells and each having a second cross-sectional area.

7. A head assembly as set forth in claim 6 wherein said first cross-sectional area is greater than said second cross-sectional area.

8. A head assembly as set forth in claim 1 wherein said head skin is disposed on an exterior surface of said skull and said facial insert.

9. A head assembly as set forth in claim 8 wherein said head skin comprises a polymeric material.

10. A head assembly as set forth in claim 1 wherein said skull comprises a metal material.

11. A crash test dummy as set forth in claim 1, wherein said plurality of walls comprise a plurality of first walls and a plurality of second walls, wherein a wall thickness of said plurality of first walls is different than a wall thickness of said plurality of second walls.

12. A head assembly for a crash test dummy comprising:
    a skull having a recess;
    a head skin comprising a polymeric material and disposed over said skull;
    a facial insert disposed within said recess between said skull and said head skin with said facial insert having a plurality of defined cell structures extending entirely through said facial insert between a front surface and an opposing rear surface to define a plurality of walls between said defined cell structures;
    said plurality of defined cell structures having a shape selected from at least one of a hexagonal, pentagonal, round, and square shape to achieve a repeatable biomechanical response for at least five impact tests that provides for evaluation of potential head injuries during vehicle crash testing; and
    at least one sensor disposed within said recess between said skull and said facial insert with said rear surface of said facial insert engaging said at least one sensor to measure a force applied to said facial insert for evaluation during vehicle crash testing.

13. A crash test dummy comprising:
    a head assembly;
    a body operatively attached to said head assembly; and
    said head assembly including a skull having a recess, a head skin disposed over said skull, a facial insert disposed within said recess between said skull and said head skin, and at least one sensor disposed within said recess between said skull and said facial insert with said facial insert engaging said at least one sensor to measure a force applied to said facial insert for evaluation during vehicle crash testing, said facial insert having a plurality of defined cell structures extending entirely through said facial insert between a front surface and an opposing rear surface to define a plurality of walls between said defined cell structures that provides for evaluation of potential head injuries during vehicle crash testing to achieve a repeatable biomechanical response for at least five impact tests that provides for evaluation of potential head injuries during vehicle crash testing,
    wherein said rear surface is configured for engagement with said at least one sensor.

14. A crash test dummy as set forth in claim 13 wherein said cell structures are hexagonal in shape.

15. A crash test dummy as set forth in claim 13 wherein said cell structures include at least a plurality of first cells each having a first cross-sectional area and a plurality of second cells different from said first cells and each having a second cross-sectional area.

16. A crash test dummy as set forth in claim 15 wherein said first cross-sectional area is greater than said second cross-sectional area.

* * * * *